US012570291B2

(12) United States Patent
Bae et al.

(10) Patent No.: US 12,570,291 B2
(45) Date of Patent: Mar. 10, 2026

(54) STEERING AND DRIVING INTERFACE DEVICE FOR A VEHICLE

(71) Applicants:HYUNDAI MOTOR COMPANY, Seoul (KR); KIA CORPORATION, Seoul (KR); POSTECH Research and Business Development Foundation, Pohang-si (KR)

(72) Inventors: Jinho Bae, Suwon-si (KR); Chang Seop An, Incheon (KR); Heecheon You, Pohang-si (KR); MinJae Kim, Pohang-si (KR); Young Jae Jung, Pohang-si (KR)

(73) Assignees: HYUNDAI MOTOR COMPANY, Seoul (KR); KIA CORPORATION, Seoul (KR); POSTECH Research and Business Development Foundation, Pohang-si (KR)

( * ) Notice: Subject to any disclaimer, the term of this patent is extended or adjusted under 35 U.S.C. 154(b) by 138 days.

(21) Appl. No.: 18/535,190

(22) Filed: Dec. 11, 2023

(65) Prior Publication Data

US 2025/0074426 A1    Mar. 6, 2025

(51) Int. Cl.
   *B60W 10/20* (2006.01)
   *B60W 30/18* (2012.01)
   *B60W 10/04* (2006.01)
(52) U.S. Cl.
   CPC ....... *B60W 30/18181* (2013.01); *B60W 10/04* (2013.01); *B60W 10/20* (2013.01); *B60W 2720/106* (2013.01); *B60W 2720/14* (2013.01)

(58) Field of Classification Search
   CPC ........... B60W 30/18181; B60W 10/04; B60W 10/20; B60W 2720/106; B60W 2720/14; B60W 60/0053; B60W 2050/143; B60K 26/02; B60K 2026/029; B60T 7/101; B62D 1/12; B60Y 2400/83
   USPC ............................................................. 701/1
   See application file for complete search history.

(56) References Cited

U.S. PATENT DOCUMENTS

| | | | | |
|---|---|---|---|---|
| 4,496,018 A | * | 1/1985 | Hsin-Min | ............. B60W 10/04 |
| | | | | 280/775 |
| 4,920,820 A | * | 5/1990 | Ingham | .................... G05G 5/05 |
| | | | | 74/471 XY |
| 5,257,673 A | * | 11/1993 | Sato | ...................... B60W 10/18 |
| | | | | 188/161 |
| 2011/0218706 A1 | * | 9/2011 | Mori | ................... B60W 30/025 |
| | | | | 701/36 |
| 2017/0174210 A1 | * | 6/2017 | Choi | ...................... B60W 30/08 |

(Continued)

*Primary Examiner* — B M M Hannan
(74) *Attorney, Agent, or Firm* — Lempia Summerfield Katz LLC

(57) ABSTRACT

A steering and driving interface device mounted in a vehicle includes a rail part fixed in the vehicle and elongated in a first direction, and a driving part coupled to the rail part. The driving part is configured to move in the first direction and control an acceleration and deceleration of the vehicle. The steering and driving interface device also includes: a steering part disposed in the rail part and configured to rotate about an axis parallel to the first direction; and a manipulation lever coupled to the steering part and the driving part and extending upward. The manipulation lever is configured to control the acceleration and deceleration of the vehicle by operating the driving part or control a rotation of the vehicle by operating the steering part.

16 Claims, 9 Drawing Sheets

(56)          References Cited

U.S. PATENT DOCUMENTS

| | | | |
|---|---|---|---|
| 2017/0334451 A1* | 11/2017 | Asakura | B60W 10/04 |
| 2019/0118852 A1* | 4/2019 | Suzuki | B60K 26/02 |
| 2020/0095075 A1* | 3/2020 | Toma | B65G 67/22 |
| 2021/0213829 A1* | 7/2021 | Choi | B62D 1/12 |
| 2022/0326726 A1* | 10/2022 | Yamamoto | G05G 1/54 |
| 2023/0384814 A1* | 11/2023 | Varisco | B62D 1/12 |
| 2025/0074189 A1* | 3/2025 | Bechtel | B60W 50/14 |
| 2025/0074426 A1* | 3/2025 | Bae | B60W 30/18181 |

* cited by examiner

STEERING AND DRIVING INTERFACE DEVICE FOR A VEHICLE

CROSS-REFERENCE TO RELATED APPLICATION

This application claims priority to and the benefit of Korean Patent Application No. 10-2023-0118481, filed on Sep. 6, 2023, the entire contents of which are incorporated herein by reference.

BACKGROUND

(a) Field

The present disclosure relates to a steering and driving interface device for a vehicle.

(b) Description of the Related Art

With the advancement of autonomous vehicle technologies, there is a need for a steering and driving human machine interface (HMI) suitable for autonomous driving environments. In this case, it is necessary to ensure driving safety and reduce workload by developing the steering and driving human machine interface that meets driver needs.

Spatial innovation of future vehicle design involves a shift of a driver seat towards the rear side of a vehicle, leading to a significant expansion of the space in front of the driver. Due to the increased space in front of the driver, the distance between the driver's foot and a pedal increases such that the pedal may not be smoothly utilized to accelerate or decelerate a vehicle.

Therefore, studies are being conducted to develop a new type of interface by modifying overall elements of the existing design and changing a shape and position of a steering and driving device.

SUMMARY

The present disclosure attempts to improve accommodation performance for an autonomous driving human machine interface so that the interface may be easily and quickly used even in a dangerous situation.

Additionally, the present disclosure attempts to provide a steering and driving interface device for a vehicle, which is capable of controlling a steering wheel, a pedal, and overall functions required to drive a vehicle when autonomous driving is stopped.

However, the object to be achieved by the disclosed embodiments is not limited to the above-mentioned object but may be variously expanded without departing from the technical spirit included in the present disclosure.

Embodiments of the present disclosure provide a steering and driving interface device mounted in a vehicle. The steering and driving interface device may include a rail part fixed in the vehicle and elongated in a first direction, and a driving part coupled to the rail part. The driving part may be configured to move in the first direction and control an acceleration and a deceleration of the vehicle. The steering and driving interface device may include a steering part disposed in the rail part and configured to rotate about an axis parallel to the first direction, and a manipulation lever coupled to the steering part and the driving part and configured to extend upward. The manipulation lever may be configured to control the acceleration and deceleration of the vehicle by operating the driving part or control a rotation of the vehicle by operating the steering part.

The manipulation lever may include an upper stick part having a shape in which a pair of bars extending upward meet together and are connected to each other at lower ends thereof. The manipulation lever may also include a lower stick part having one end connected to a lower end of the upper stick part, and another end coupled to the steering part.

The manipulation lever may further include a hinge member provided between the upper stick part and the lower stick part and configured to be bent in the first direction.

The driving part may include a sliding block coupled to the rail part and configured to reciprocate in the first direction. The driving part may also include a sliding sensing part disposed on the rail part or the sliding block and configured to sense a motion of the sliding block.

The driving part may further include a sliding assistance part. The sliding assistance part may include a sliding worm wheel fixed to the sliding block, and a sliding gear fixed to the rail part and coupled to the sliding worm wheel. The sliding assistance part may also include a sliding motor having a driving shaft coupled to a rotary shaft of the sliding gear.

The sliding sensing part may include: a sliding sensing rack disposed at an upper end of the rail part; and a sliding sensing wheel disposed on the sliding block and configured to rotate while coming into contact with the sliding sensing rack in accordance with a movement of the sliding block.

The rail part may include support ends extending from an upper end of the rail part in a direction in which the support ends face each other. The sliding block may include sliding bearing pins provided on portions facing lower surfaces of the support ends.

The steering part may be disposed in the sliding block. One end of the manipulation lever may be coupled to a rotary shaft of the steering part. Additionally, another end of the manipulation lever may protrude upward from the sliding block.

The sliding block may have a slit extending in a second direction intersecting the first direction. The slit may be formed in an upper surface of the sliding block from which the manipulation lever protrudes.

The steering part may further include a steering torque angle sensor connected to a steering rotary shaft and configured to detect rotational torque.

The steering part may further include a steering assistance part including: a steering worm wheel fixed to a steering rotary shaft; and a steering motor having a driving shaft coupled to the steering worm wheel.

The steering and driving interface device may further include a controller configured to generate an instruction for operating the vehicle by receiving a driving signal in accordance with a motion of the manipulation lever. The controller may include a steering angle instruction generation part configured to generate a steering angle instruction by receiving steering torque measured by a steering part. The controller may also include a road wheel actuator control part configured to rotate a road wheel by receiving the steering angle instruction. The controller may further include a manipulation lever position control part configured to receive feedback of a steering angle value of the road wheel and transmit an instruction to the steering part.

The steering and driving interface device may further include a controller configured to generate an instruction for operating the vehicle by receiving a driving signal in accordance with a motion of the manipulation lever. The controller may include a speed instruction generation part configured to generate a vehicle speed instruction by receiving a sliding stroke measured by a driving part. The controller may also include a vehicle speed control part configured to control a vehicle speed by receiving the vehicle speed instruction.

The controller may further include a manipulation lever position control part configured to receive feedback of the vehicle speed and transmit an instruction to the driving part.

A vehicle according to another embodiment may include a steering and driving interface device for a vehicle. The steering and driving interface device may include a rail part fixed in the vehicle and elongated in a first direction, and a driving part coupled to the rail part. The driving part may be configured to move in the first direction and control an acceleration and a deceleration of the vehicle. The steering and driving interface device may include a steering part disposed in the rail part and configured to be rotatable about an axis parallel to the first direction, and a manipulation lever coupled to the steering part and the driving part and extending upward. The manipulation lever may be configured to control the acceleration and deceleration of the vehicle by operating the driving part or control a rotation of the vehicle by operating the steering part.

According to the steering and driving interface device for a vehicle according to the embodiment, the steering wheel, the pedal, and the overall functions required to drive the vehicle may be controlled by the one-handed human machine interface when autonomous driving has stopped.

In other words, according to the steering and driving interface device for a vehicle according to the embodiment, it is possible to maximally utilize the interior space for the driver of the autonomous vehicle by excluding the steering wheel, the brake, and the accelerator system in the related art.

In addition, the interface device may provide the manipulation convenience for the driver by applying the vehicle manipulation system, to which the leftward/rightward rotation steering joystick and the sliding joystick for driving and braking the vehicle are coupled, to the inside of the armrest of the driver seat.

BRIEF DESCRIPTION OF THE DRAWINGS

These drawings are for reference only in describing embodiments of the present disclosure. Therefore, the technical idea of the present disclosure should not be limited to the accompanying drawings.

FIG. 1 is a perspective view illustrating a steering and driving interface device for a vehicle according to an embodiment of the present disclosure.

FIGS. 2 to 4 are perspective views explaining a driving part and a steering part of the steering and driving interface device for a vehicle illustrated in FIG. 1.

DETAILED DESCRIPTION

Figure 3:
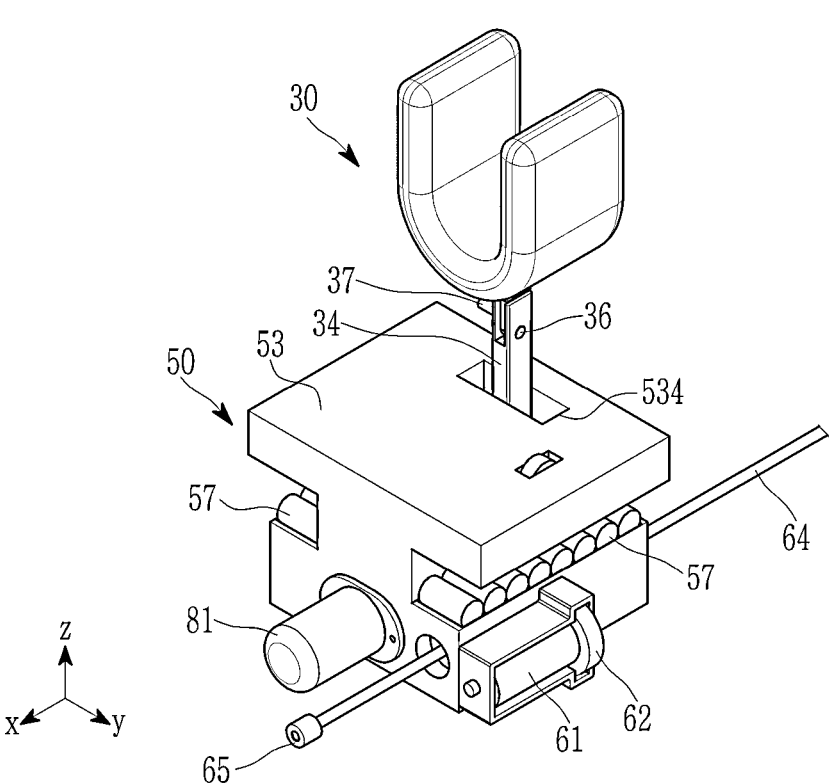

The embodiments of the present disclosure are described in detail with reference to the accompanying drawings so that those having ordinary skill in the art to which the present disclosure pertains may easily carry out the embodiments. In the drawings, a part determined to be irrelevant to the description is omitted to clearly describe the present disclosure, and the same or similar constituent elements are designated by the same reference numerals throughout the specification. Some constituent elements in the accompanying drawings are illustrated in an exaggerated or schematic form or are omitted. A size of each constituent element does not entirely reflect an actual size.

In addition, it should be interpreted that the accompanying drawings are provided only to allow those having ordinary skill in the art to easily understand the embodiments disclosed in the present specification. Additionally, the technical spirit disclosed in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

As publicly known in the art, some of exemplary forms may be illustrated in the accompanying drawings from the viewpoint of function blocks, units, controllers and/or modules. Those having ordinary skill in the art should understand that such blocks, units, controllers and/or modules are physically implemented by electronic (or optical) circuits such as logic circuits, discrete components, processors, hard wired circuits, memory devices and wiring connections. When the blocks, units, controllers and/or modules are implemented by processors or other similar hardware, the blocks, units, controllers and modules may be programmed and controlled through software (for example, codes) in order to perform various functions discussed in the present disclosure.

In addition, when one component such as a layer, a film, an area, or a plate is described as being positioned "above" or "on" another component, one component can be positioned "directly on" another component, and one component can also be positioned on another component with other components interposed therebetween. On the contrary, when one component is described as being positioned "directly above" another component, there is no component therebetween. In addition, when a component is described as being positioned "above" or "on" a reference part, the component may be positioned "above" or "below" the reference part, and this configuration does not necessarily mean that the component is positioned "above" or "on" the reference part in a direction opposite to gravity.

Throughout the specification, it should be understood the terms "comprises," "comprising," "includes," "including," "containing," "has," "having" or other variations thereof are inclusive and therefore specify the presence of stated features, integers, steps, operations, elements, components, or combinations thereof. However, these terms do not preclude the presence or addition of one or more other features, integers, steps, operations, elements, components, or combinations thereof. Therefore, unless explicitly described to the contrary, the word "comprise/include" and variations such as "comprises/includes" or "comprising/including" should be understood to imply the inclusion of stated elements, not the exclusion of any other elements.

In addition, throughout the specification, the phrase "in a plan view" means when an object is viewed from above, and the phrase "in a cross-sectional view" means when a cross section made by vertically cutting an object is viewed from a lateral side.

In addition, throughout the specification, when one constituent element is referred to as being "connected to" another constituent element, one constituent element can be "directly connected to" the other constituent element, and one constituent element can also be "indirectly connected to," "physically connected to," or "electrically connected to" the other element with other elements therebetween. Further, the constituent elements are defined as different names according to positions or functions thereof, but the constituent elements may be integrated.

When a component, device, element, or the like of the present disclosure is described as having a purpose or performing an operation, function, or the like, the component, device, or element should be considered herein as being "configured to" meet that purpose or perform that operation or function.

It should be understood that the terms "vehicle," "vehicular," and other similar terms as used herein are inclusive of motor vehicles in general. Such motor vehicles may encompass passenger automobiles including sport utility vehicles (SUV), buses, trucks, various commercial vehicles, watercraft including a variety of boats and ships, aircraft, and the like. Such motor vehicles may also include hybrid vehicles, electric vehicles, plug-in hybrid electric vehicles, hydrogen-powered vehicles, and other alternative fuel vehicles (e.g., fuels derived from resources other than petroleum). As referred to herein, a hybrid vehicle is a vehicle that has two or more sources of power, for example vehicles that are powered by both gasoline and electricity.

Figure 1:
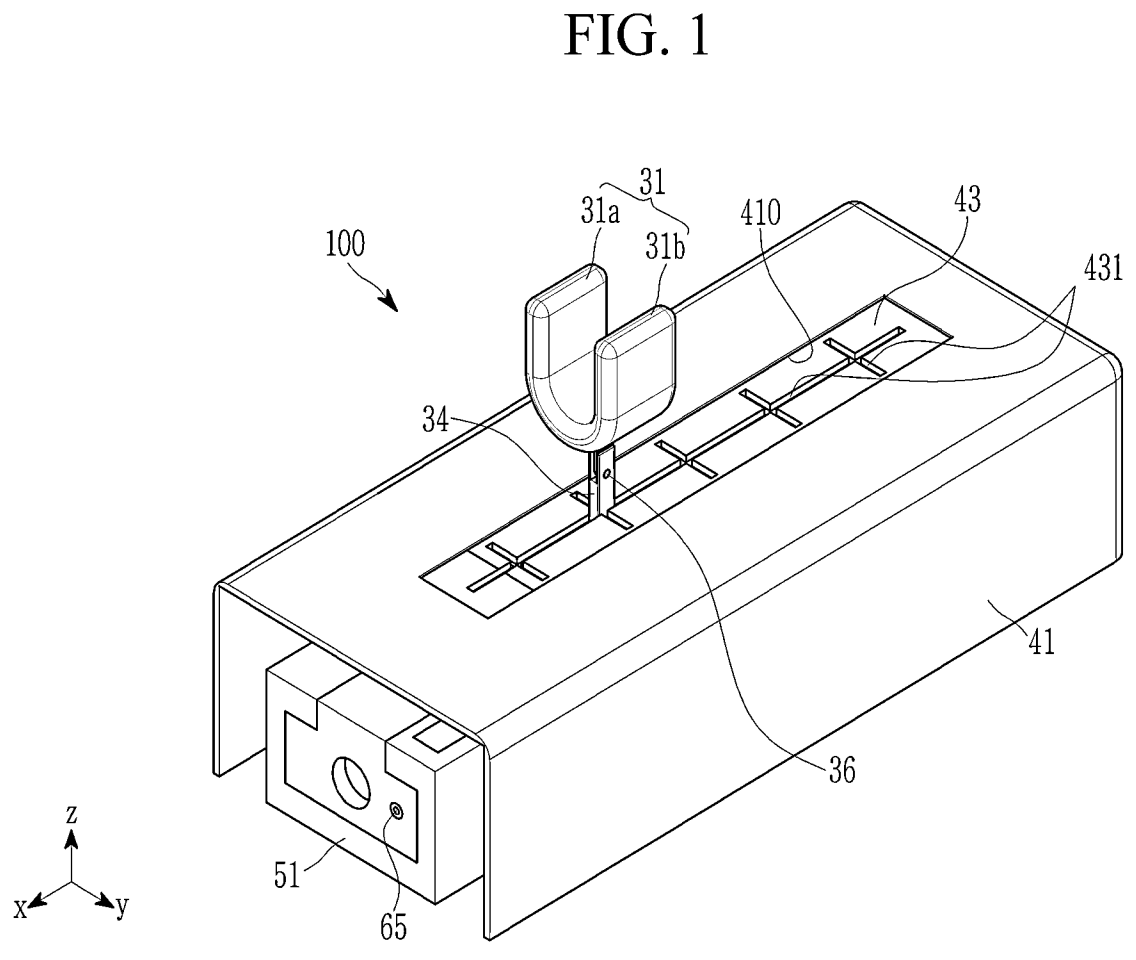

FIG. 1 is a perspective view illustrating a steering and driving interface device for a vehicle according to an embodiment.

With reference to FIG. 1, a steering and driving interface device 100 for a vehicle according to the present embodiment is a device mounted in a vehicle. The device includes a rail part 51 fixed in the vehicle, and a driving part 50 (see FIG. 2) configured to control acceleration and deceleration of the vehicle. The driving device also includes a steering part 70 (see FIG. 4) configured to control a rotation direction of the vehicle, and a manipulation lever 30 configured to operate the driving part 50 and the steering part 70.

The manipulation lever 30 may be coupled to the steering part 70 and the driving part 50 and extend upward (i.e., a z-axis direction in the drawings). The manipulation lever 30 may control the acceleration and deceleration of the vehicle by operating the driving part 50. The manipulation lever 30 may also control a rotation of the vehicle by operating the steering part 70. The manipulation lever 30 may be provided in the form of a joystick.

The steering and driving interface device 100 for a vehicle may be disposed on an armrest in the vehicle. The rail part 51, the driving part 50, and the steering part 70 may be covered by an armrest outer cover 41. The manipulation lever 30 may reciprocate along the rail part 51. The armrest outer cover 41 may have an opening 410 extending in one direction along a movement route of the manipulation lever 30. The opening 410 of the armrest outer cover 41 is covered by a slit cover 43, and the slit cover 43 has a slit 431 formed along the movement route of the manipulation lever 30. Therefore, the slit cover 43 may protect the rail part 51, the driving part 50, and the steering part 70, which are covered by the armrest outer cover 41, without hindering the movement of the manipulation lever 30.

Hereinafter, detailed structures of the driving part 50 and the steering part 70 are described with reference to FIGS. 2 to 4.

Figure 2:
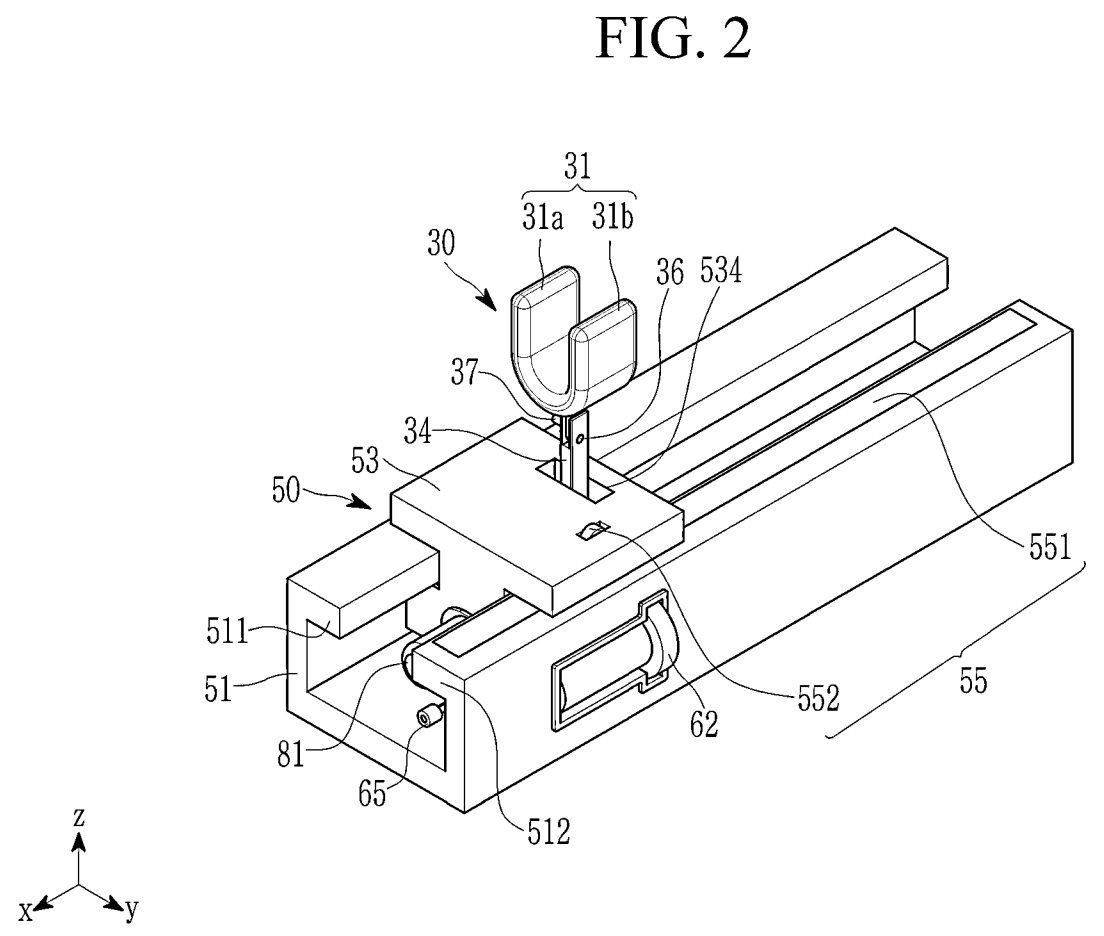
Figure 4:
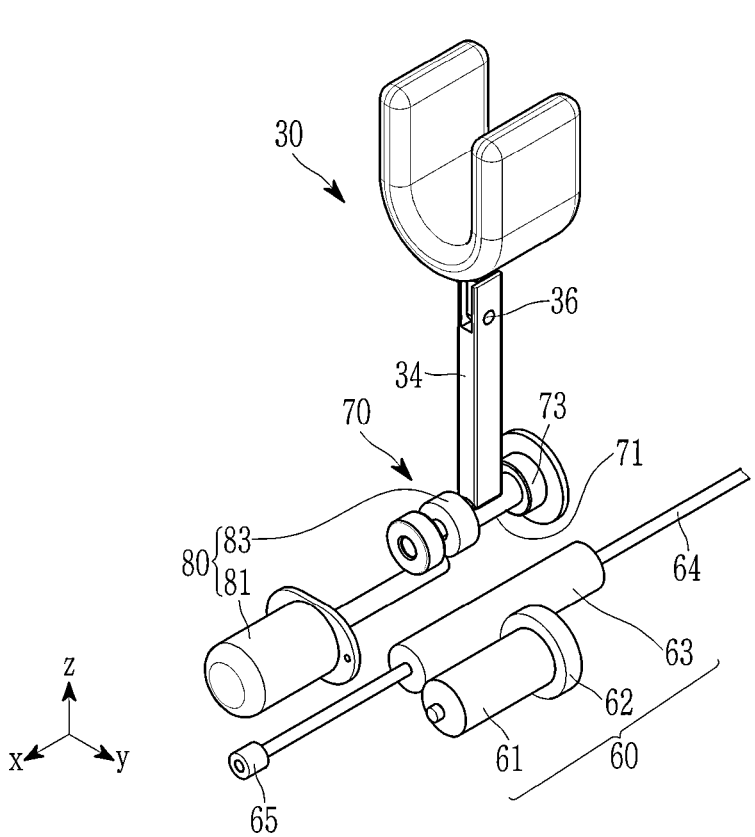

FIGS. 2 to 4 are perspective views explaining the driving part and the steering part of the steering and driving interface device for a vehicle illustrated in FIG. 1.

With reference to FIGS. 2 and 3, the rail part 51 may be elongated in a first direction (an x-axis direction in the drawings) in the vehicle. The driving part 50 may be coupled to the rail part 51 so as to be movable in the first direction. The steering part 70 may be disposed in the rail part 51 and rotate about a rotation axis parallel to the first direction.

The manipulation lever 30 may include an upper stick part 31 and a lower stick part 34. The upper stick part 31 and the lower stick part 34 are connected to each other by a hinge member 36. The upper stick part 31 may be configured to be bendable in the first direction from the hinge member 36. Therefore, when the manipulation lever 30 is not operated, the hinge member 36 may be bent, and the upper stick part 31 may be laid down. A solenoid pin 37 may be applied to the hinge member 36 to fix the upper stick part 31 when the upper stick part 31 stands.

The upper stick part 31 may have a U shape in which a pair of bars 31a and 31b extending upward meet together and are connected to each other at the lower ends thereof when the manipulation lever 30 is operated. One end of the lower stick part 34 may be connected to the lower end of the upper stick part 31, and the other end of the lower stick part 34 may be coupled to the steering part 70. The lower end of the upper stick part 31 and an upper end of the lower stick part 34, which are connected by the hinge member 36, may be surrounded by a protection tube (not illustrated). The protection tube may be provided in the form of a corrugated pipe disposed outside the upper stick part 31 and the lower stick part 34.

The driving part 50 includes a sliding block 53, and a sliding sensing part 55 configured to sense a motion of the sliding block 53. The sliding block 53 may be coupled to the rail part 51 and reciprocate in the first direction. The sliding sensing part 55 may be disposed on the sliding block 53 and configured to sense the motion of the sliding block 53.

The sliding sensing part 55 may include a sliding sensing rack 551 disposed at an upper end of the rail part 51, and a sliding sensing wheel 552 disposed on the sliding block 53. The sliding sensing wheel 552 may be configured to be rotated by the movement of the sliding block 53 while coming into contact with the sliding sensing rack 551.

The rail part 51 may include support ends 511 and 512 extending from the upper end of the rail part 51 in a direction in which the support ends 511 and 512 face each other. The sliding block 53 may have sliding bearing pins 57 provided on portions that face the lower surfaces of the support ends 511 and 512. The sliding bearing pins 57 may roll while supporting the lower surfaces of the support ends 511 and 512 so that the sliding block 53 may move smoothly.

With reference to FIG. 4, the driving part 50 includes a sliding assistance part 60 configured to generate and provide driving power for moving the sliding block 53. The sliding assistance part 60 may include a sliding worm wheel 63 fixed to the sliding block 53, a sliding gear 62 fixed to the rail part 51, and a sliding motor 61 having a driving shaft. The sliding gear 62 may be coupled (e.g., gear-coupled) to the sliding worm wheel 63. A rotary shaft of the sliding gear 62 may be coupled to the driving shaft of the sliding motor 61. The sliding motor 61 may be fixed to the rail part 51. Therefore, the sliding block 53 may be stably manipulated with the assistance of the sliding motor 61.

The sliding worm wheel 63 may be fixed to a sliding worm screw 64, and the sliding worm screw 64 may be fixed to one end of the rail part 51 with a support bearing 65 interposed therebetween. Therefore, the sliding worm wheel 63 may be rotated in a state in which the sliding worm wheel 63 is supported by the rail part 51.

The steering part 70 may be disposed in the sliding block 53. One end of the manipulation lever 30 may be coupled to a steering rotary shaft 71 of the steering part 70, and the other end of the manipulation lever 30 may protrude upward from the sliding block 53. The sliding block 53 may have a slit 534 formed in an upper surface of the sliding block 53 through which the manipulation lever 30 protrudes. The slit 534 extends in a second direction (a y-axis direction in the drawings) intersecting the first direction.

With reference to FIG. 4, the steering part 70 may include a steering torque angle sensor 73 connected to the steering rotary shaft 71 and configured to detect rotational torque. The steering part 70 may include a steering assistance part 80 configured to allow the manipulation lever 30 to rotate smoothly. The steering assistance part 80 may include a steering worm wheel 83 fixed to the steering rotary shaft 71, and a steering motor 81 having a driving shaft coupled (e.g., gear-coupled) to the steering worm wheel 83. The steering motor 81 may be fixed to the sliding block 53.

When a driver rotates the manipulation lever 30 leftward or rightward, the steering torque angle sensor 73 detects torque, and the steering motor 81 assists a rotational force of the manipulation lever 30.

Figure 5:
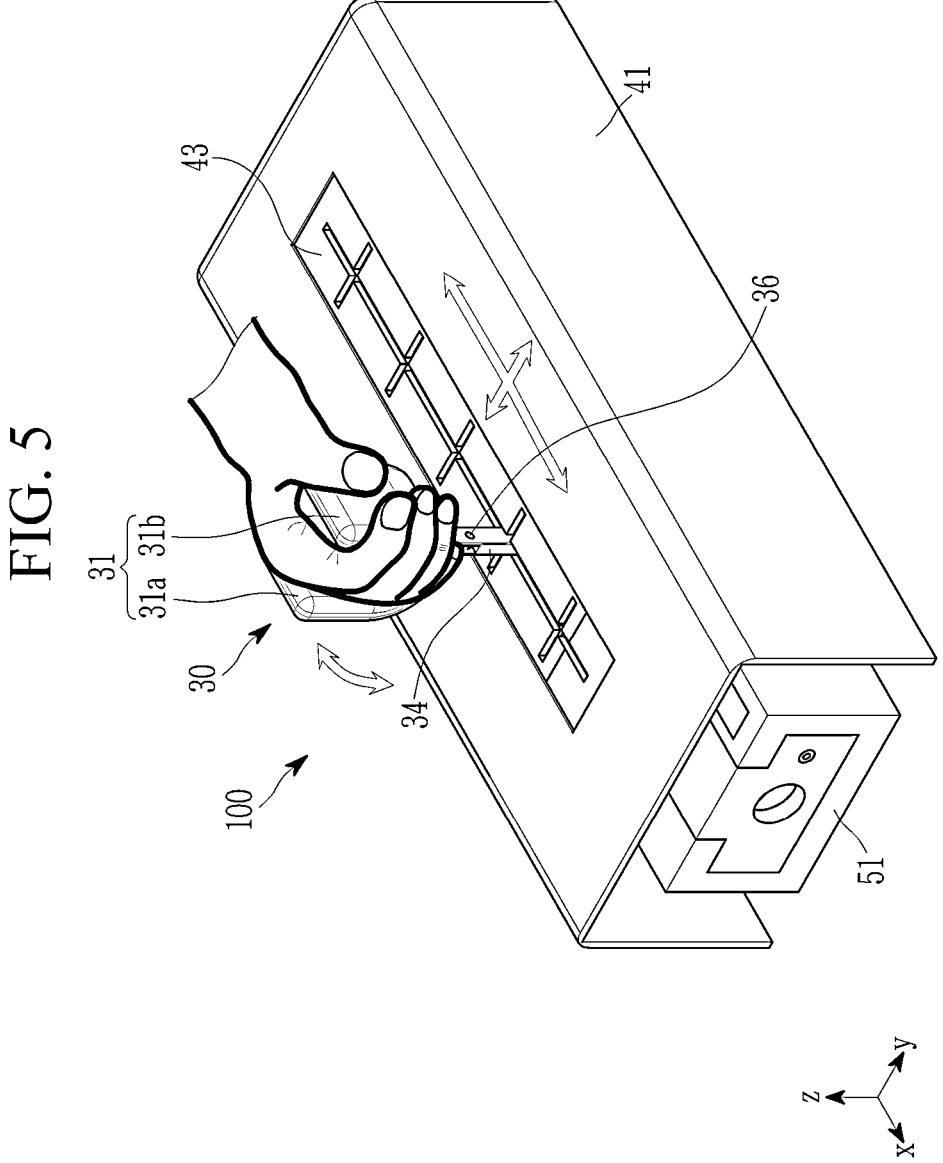
FIGS. 5 and 6 are perspective views explaining a method of operating the steering and driving interface device for a vehicle illustrated in FIG. 1.
Figure 6:
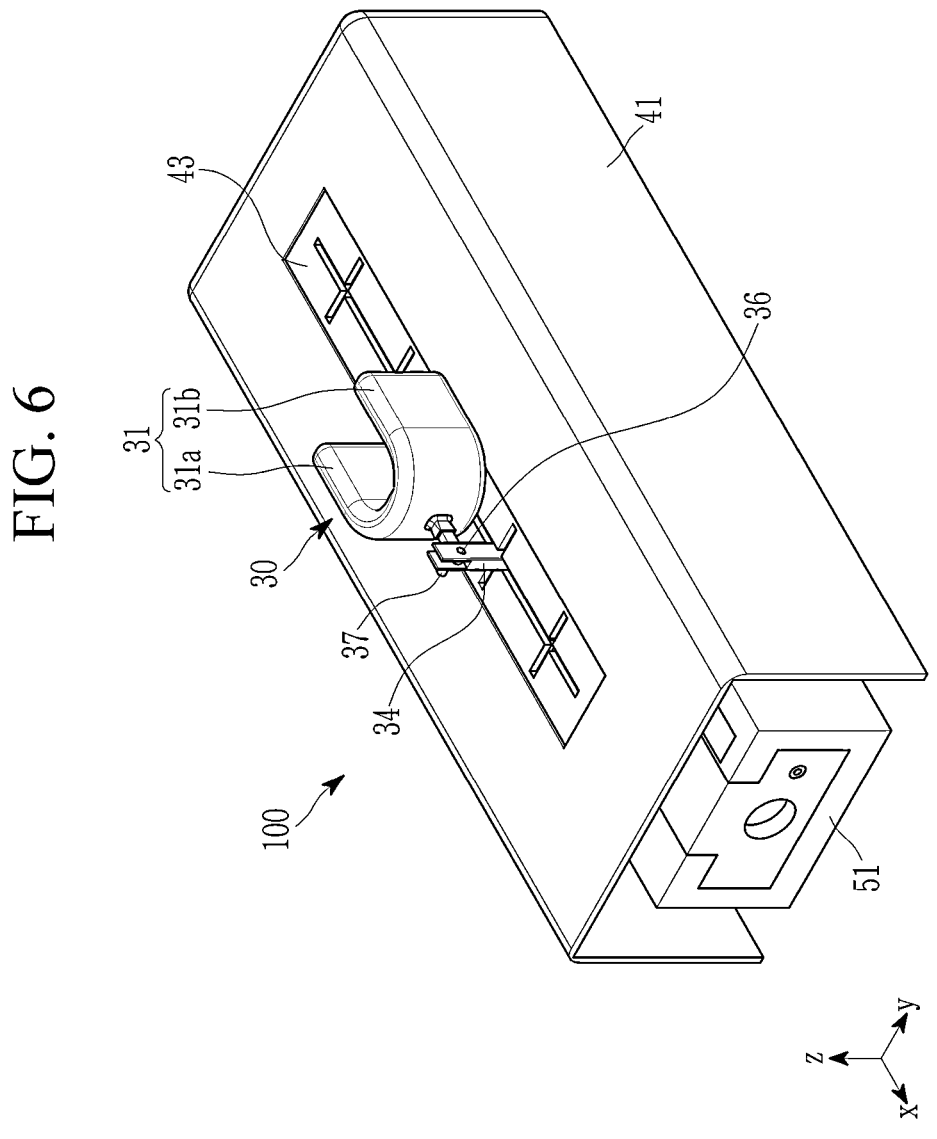

FIGS. 5 and 6 are perspective views explaining a method of operating the steering and driving interface device for a vehicle illustrated in FIG. 1.

With reference to FIG. 5, the driver may grip the manipulation lever 30 and operate the manipulation lever 30 forward or rearward in the first direction (the x-axis direction in the drawings). In this case, the driving part 50 (see FIG. 3) connected to the manipulation lever 30 may accelerate or decelerate the vehicle.

In addition, the driver may grip the manipulation lever 30 and operate the manipulation lever 30 leftward or rightward in the second direction (the y-axis direction in the drawings). In this case, the steering part 70 (see FIG. 4) connected to the manipulation lever 30 may turn the vehicle leftward or rightward.

Because the upper stick part 31 of the manipulation lever 30 has a U shape extending upward, the driver may conveniently hold the upper stick part 31 with his/her hand and easily control the vehicle.

With reference to FIG. 6, when the driver does not use the manipulation lever 30, the driver folds the hinge member 36 and lays down the upper stick part 31 of the manipulation lever 30 in the first direction. The hinge member 36 may be folded automatically or manually, such that a space for the driver may be further ensured in the vehicle.

The steering and driving interface device 100 for a vehicle may be accommodated in the vehicle in an automatic traveling situation. For example, the steering and driving interface device 100 may be positioned in an armrest part at a right side of the driver seat when the steering and driving interface device 100 for a vehicle is not used. When an accommodation box (not illustrated) is opened, as necessary, a hardware part (not illustrated) may be moved upward and exposed in a pop-up manner. In this case, the U-shaped manipulation lever 30 may be laid down, and the driver may pull and unfold the manipulation lever 30 to use the manipulation lever 30.

When it is determined that the vehicle cannot be autonomously driven, the steering and driving interface device 100 for a vehicle may switch the driving mode from automatic driving to manual driving and raise an alarm. It may be determined that autonomous driving cannot be performed when the autonomous driving system fails because the vehicle cannot recognize a surrounding environment because of an unexpected situation such as an error of a system, damage to a sensor, and bad weather. A main processing device of the vehicle takes over the control after the determination, and the control may be taken over manually after the hardware part is exposed. The alarm may include a visual notification through a display mounted at a front side of the vehicle and an auditory notification of a sound system.

Figure 7:
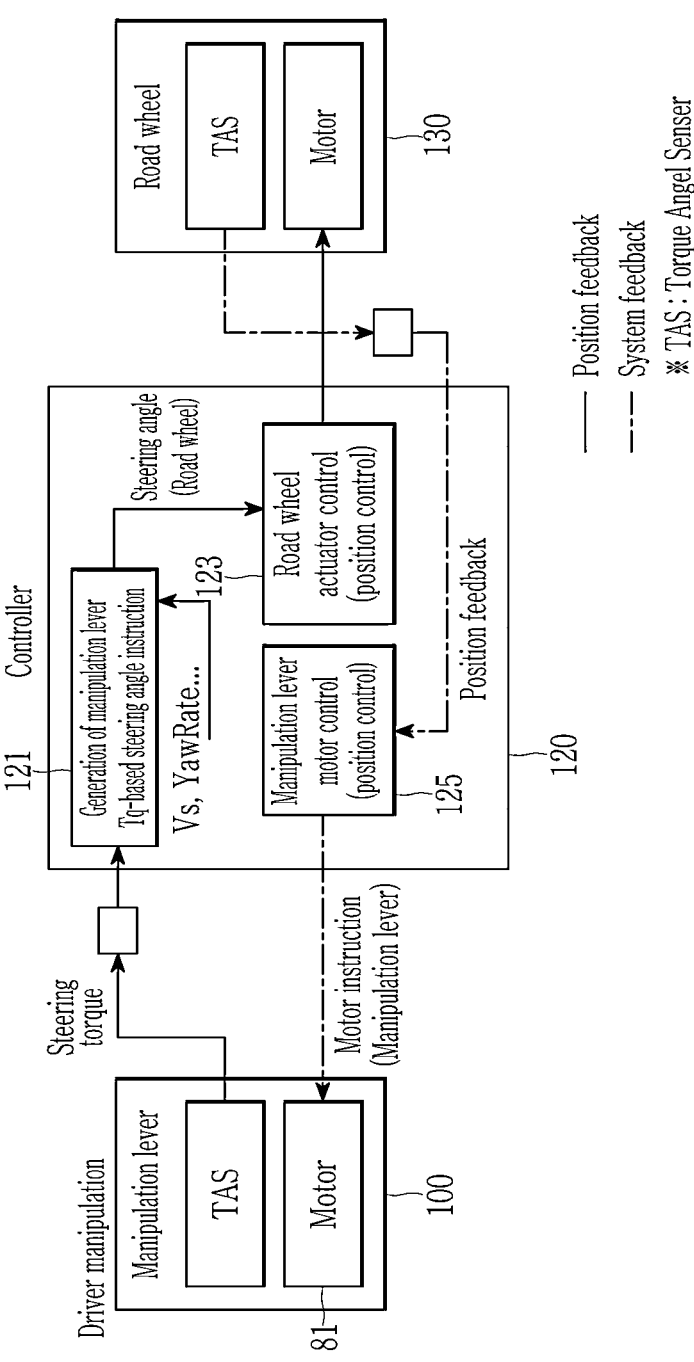
FIG. 7 is a block diagram explaining steering logic of a controller of the steering and driving interface device for a vehicle according to an embodiment of the present disclosure.
Figure 8:
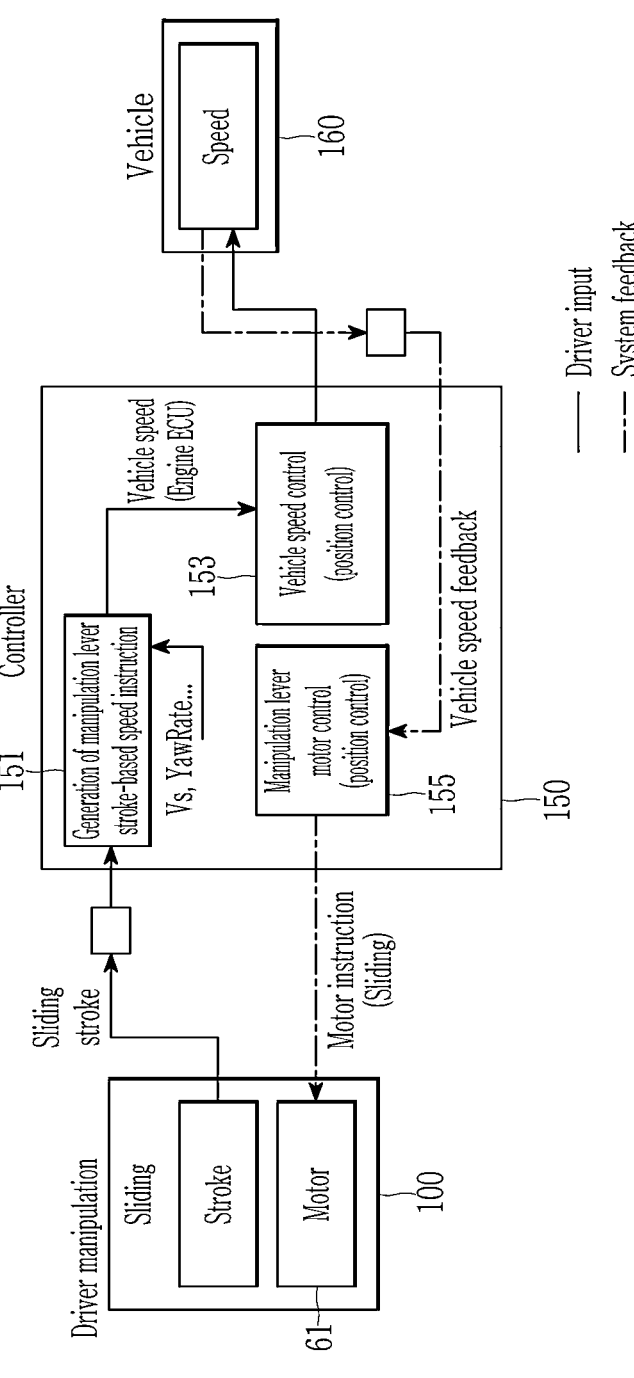
FIG. 8 is a block diagram explaining drive/control logic of the controller of the steering and driving interface device for a vehicle according to an embodiment of the present disclosure.

FIG. 7 is a block diagram explaining the steering logic of a controller of the steering and driving interface device for a vehicle according to the embodiment. FIG. 8 is a block diagram explaining the drive/control logic of the controller of the steering and driving interface device for a vehicle according to the embodiment.

The steering and driving interface device 100 for a vehicle according to the present embodiment includes controllers 120 and 150 configured to generate instructions for operating the vehicle by receiving a driving signal according to a motion of the manipulation lever 30. In this case, the steering and driving interface device 100 may include a controller 120 for steering logic and a controller 150 for driving/braking logic.

With reference to FIG. 7, the controller 120 may include a steering angle instruction generation part 121 configured to generate a steering angle instruction. The controller 120 may also include a road wheel actuator control part 123 configured to rotate a road wheel 130. The steering angle instruction generation part 121 may generate the steering angle instruction by receiving steering torque measured by the steering torque angle sensor 73 (see FIG. 4) of the steering part 70. The steering angle instruction generation part 121 may generate the torque-based steering angle instruction by applying steering torque, a vehicle speed, a vehicle yaw rate, and the like. The road wheel actuator control part 123 may rotate the road wheel 130 by receiving the steering angle instruction.

In addition, the controller 120 may include a manipulation lever position control part 125 configured to receive feedback of a steering angle value of the road wheel 130 and transmit an instruction to the steering part 70. When the steering angle value of the road wheel 130 is inputted to the steering motor 81 of the steering assistance part 80, a steering assistance function may be performed.

With reference to FIG. 8, the controller 150 may include a speed instruction generation part 151 configured to generate a vehicle speed instruction, and a vehicle speed control part 153 configured to control a vehicle speed. The speed instruction generation part 151 may generate the vehicle speed instruction by receiving a sliding stroke measured by the driving part 50.

When the sliding sensing wheel 552 (see FIG. 2) connected to the sliding sensing rack 551 (see FIG. 2) is rotated, the stroke may be calculated by reading out a value of an angle at a position of the sliding sensing wheel 552 and converting the value of the angle. When the sliding block 53 (see FIG. 2) is pushed forward from a reference point (center), the vehicle begins to move, and the speed increases. When the sliding block 53 is pulled rearward, the vehicle speed decreases, and the vehicle is finally stopped.

The vehicle speed control part 153 may operate the vehicle 160 by receiving information such as a sliding stroke and a vehicle speed and may control the vehicle speed.

The controller 150 may include the manipulation lever motor control part 155 configured to receive the feedback of the speed of the vehicle 160 and transmit the instruction to the driving part 50. The vehicle speed and the like may be fed back to the sliding motor 61 (see FIG. 3) of the driving part 50, and the sliding assistance function may be performed.

Figure 9:
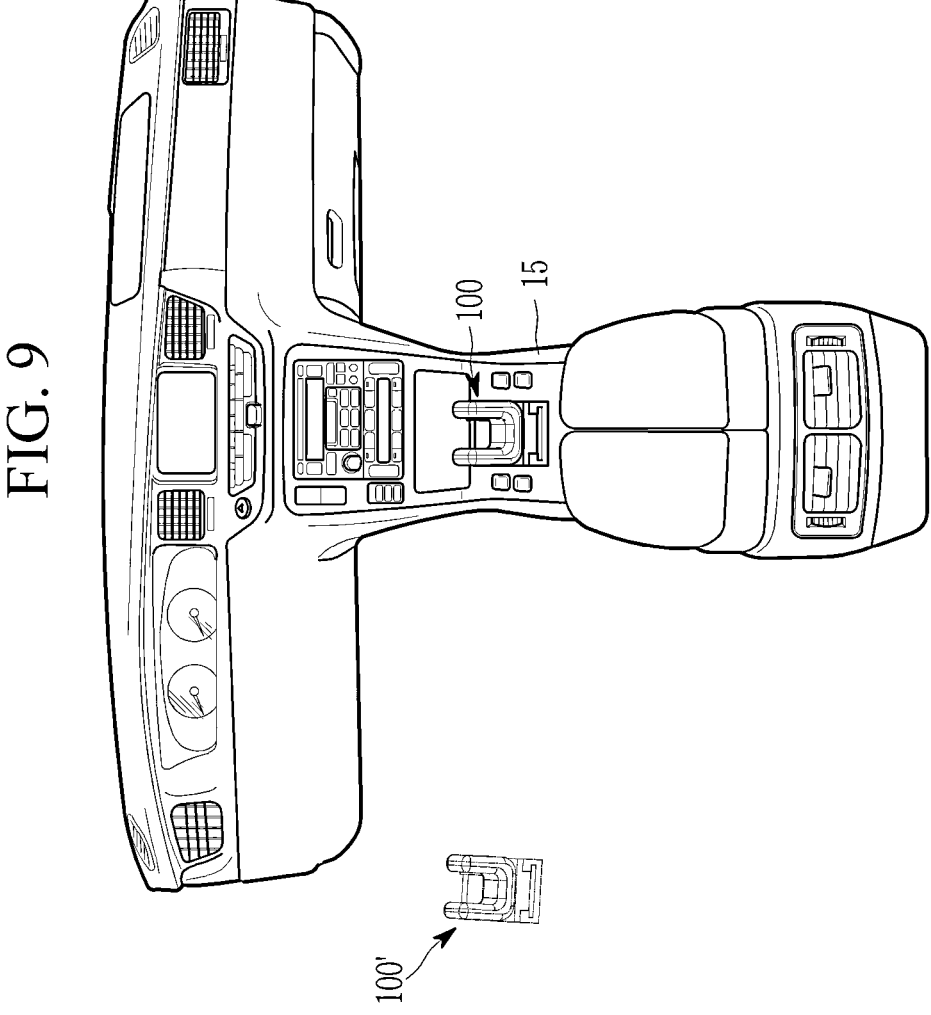
FIG. 9 is a view explaining a position at which the steering and driving interface device for a vehicle illustrated in FIG. 1 is disposed in a vehicle.

FIG. 9 is a view explaining a position at which the steering and driving interface device for a vehicle illustrated in FIG. 1 is disposed in the vehicle.

With reference to FIG. 9, the steering and driving interface device 100 for a vehicle according to the present embodiment may be disposed on an armrest 15 in the vehicle. Even in a situation in which the seat is moved rearward, the driver may operate the steering and driving interface device 100 for a vehicle to control the steering, the acceleration, and the deceleration of the vehicle.

In addition, with the steering and driving interface device 100 for a vehicle, an accelerator pedal function and a steering function of a vehicle in the related art are combined at one position, such that a steering wheel and a pedal may be excluded. Therefore, it is possible to decrease a space occupied by the components in the vehicle and increase a space that may be used by the occupants. Further, the steering and driving interface device 100 for a vehicle may stably manipulate the acceleration and deceleration of the vehicle even in a high-speed turning condition.

As another example, a steering and driving interface device 100' for a vehicle may be disposed inside a vehicle door positioned at a left side of the driver.

According to the steering and driving interface device for a vehicle according to the described embodiments, it is possible to maximize the spatial utilization for the driver by eliminating the steering wheel, the accelerator pedal, and the brake pedal from the autonomous vehicle. Therefore, it is possible to variously improve the spatial utilization for the driver in the driver seat.

In the situation in which the utilization of the space in the vehicle is improved, it is necessary to provide an armrest. The armrest allows the driver to rest the arm by obliquely laying down the seat and resting the arm on the armrest. The steering and driving interface device for a vehicle according to the present embodiment may be added by efficiently using the armrest space.

In a situation in which the seat is pushed rearward during autonomous driving, it is difficult for the driver's body to reach the steering wheel and the pedal in the related art. However, in case that the steering and driving interface device for a vehicle is provided in the vicinity of the armrest, the convenience may be improved.

While the embodiments of the present disclosure have been described above, the present disclosure is not limited thereto. Various modifications can be made and carried out within the scope of the claims, the detailed description of the present disclosure, the accompanying drawings, and the scope of the present disclosure.

DESCRIPTION OF SYMBOLS

100, 100': Steering and driving interface device for a vehicle

30: Manipulation lever
31: Upper stick part
34: Lower stick part
50: Driving part
51: Rail part
53: Sliding block
55: Sliding sensing part
60: Sliding assistance part
70: Steering part
80: Steering assistance part
120, 150: Controller

What is claimed is:

1. A steering and driving interface device mounted in a vehicle, the steering and driving interface device comprising:
a rail part fixed in the vehicle and elongated in a first direction;
a driving part coupled to the rail part, wherein the driving part is configured to move in the first direction and control an acceleration and deceleration of the vehicle;
a steering part disposed in the rail part and configured to rotate about an axis parallel to the first direction; and
a manipulation lever coupled to the steering part and the driving part and configured to extend upward,
wherein the manipulation lever is configured to:
control the acceleration and deceleration of the vehicle by operating the driving part, or
control a rotation of the vehicle by operating the steering part.

2. The steering and driving interface device of claim 1, wherein the manipulation lever comprises:
an upper stick part having a shape in which a pair of bars extending upward meet together and are connected to each other at lower ends thereof; and
a lower stick part having one end connected to a lower end of the upper stick part, and another end coupled to the steering part.

3. The steering and driving interface device of claim 2, wherein the manipulation lever further comprises a hinge member provided between the upper stick part and the lower stick part and configured to be bent in the first direction.

4. The steering and driving interface device of claim 1, wherein the driving part comprises:
a sliding block coupled to the rail part and configured to reciprocate in the first direction; and
a sliding sensing part disposed on the rail part or the sliding block and configured to sense a motion of the sliding block.

5. The steering and driving interface device of claim 4, wherein the driving part further comprises a sliding assistance part comprising:
a sliding worm wheel fixed to the sliding block;
a sliding gear fixed to the rail part and coupled to the sliding worm wheel; and
a sliding motor having a driving shaft coupled to a rotary shaft of the sliding gear.

6. The steering and driving interface device of claim 4, wherein the sliding sensing part comprises:
a sliding sensing rack disposed at an upper end of the rail part; and
a sliding sensing wheel disposed on the sliding block and configured to rotate while coming into contact with the sliding sensing rack in accordance with a movement of the sliding block.

7. The steering and driving interface device of claim 4, wherein:

the rail part comprises support ends extending from an upper end of the rail part in a direction in which the support ends face each other, and the sliding block comprises sliding bearing pins provided on portions facing lower surfaces of the support ends.

8. The steering and driving interface device of claim 4, wherein:

the steering part is disposed in the sliding block, one end of the manipulation lever is coupled to a rotary shaft of the steering part, and another end of the manipulation lever protrudes upward from the sliding block.

9. The steering and driving interface device of claim 8, wherein:

the sliding block has a slit extending in a second direction intersecting the first direction, and the slit is formed in an upper surface of the sliding block from which the manipulation lever protrudes.

10. The steering and driving interface device of claim 1, wherein the steering part further comprises a steering torque angle sensor connected to a steering rotary shaft and configured to detect a rotational torque.

11. The steering and driving interface device of claim 1, wherein the steering part further comprises a steering assistance part comprising:

a steering worm wheel fixed to a steering rotary shaft; and a steering motor including a driving shaft coupled to the steering worm wheel.

12. The steering and driving interface device of claim 1, further comprising:

a controller configured to generate an instruction for operating the vehicle by receiving a driving signal in accordance with a motion of the manipulation lever, wherein the controller comprises:

a steering angle instruction generation part configured to generate a steering angle instruction by receiving a steering torque measured by a steering part; and a road wheel actuator control part configured to turn a road wheel by receiving the steering angle instruction.

13. The steering and driving interface device of claim 12, wherein the controller further comprises a manipulation lever position control part configured to receive feedback of a steering angle value of the road wheel and transmit an instruction to the steering part.

14. The steering and driving interface device of claim 1, further comprising:

a controller configured to generate an instruction for operating the vehicle by receiving a driving signal in accordance with a motion of the manipulation lever, wherein the controller comprises:

a speed instruction generation part configured to generate a vehicle speed instruction by receiving a sliding stroke measured by a driving part; and a vehicle speed control part configured to control a vehicle speed by receiving the vehicle speed instruction.

15. The steering and driving interface device of claim 14, wherein the controller further comprises a manipulation lever position control part configured to receive feedback of the vehicle speed and transmit an instruction to the driving part.

16. A vehicle comprising:

a steering and driving interface device mounted in the vehicle, wherein the steering and driving interface device includes:

a rail part fixed in the vehicle and elongated in a first direction;

a driving part coupled to the rail part, wherein the driving part is configured to move in the first direction and control an acceleration and deceleration of the vehicle;

a steering part disposed in the rail part and configured to rotate about an axis parallel to the first direction; and a manipulation lever coupled to the steering part and the driving part and configured to extend upward, and wherein the manipulation lever is configured to:

control the acceleration and deceleration of the vehicle by operating the driving part, or control a rotation of the vehicle by operating the steering part.

* * * * *